J. A. RICKABAUGH.
CAR DOOR.
APPLICATION FILED JAN. 17, 1908.
903,406.
Patented Nov. 10, 1908.
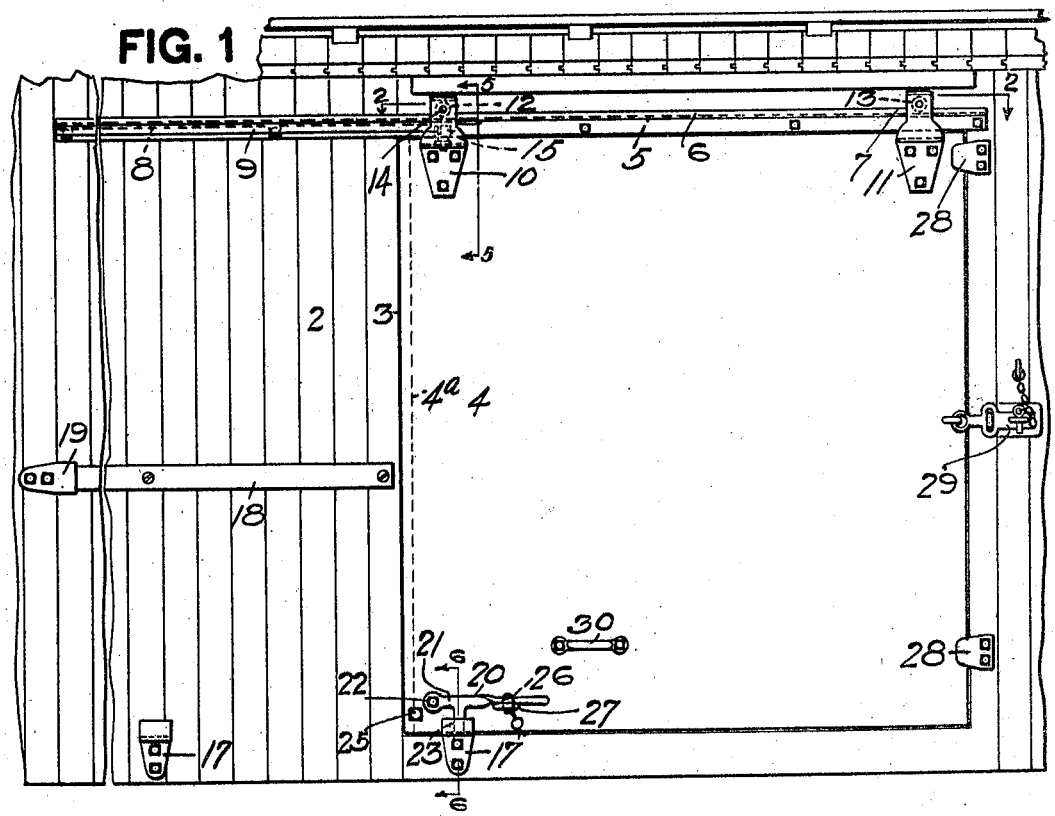
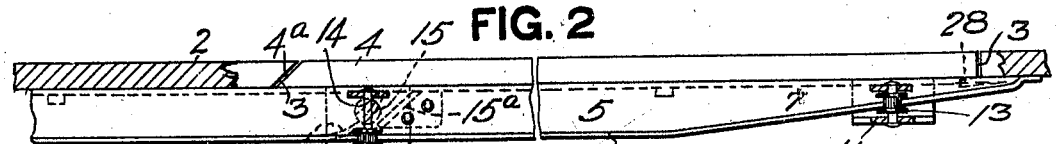
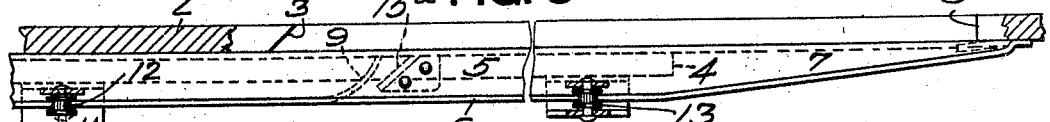
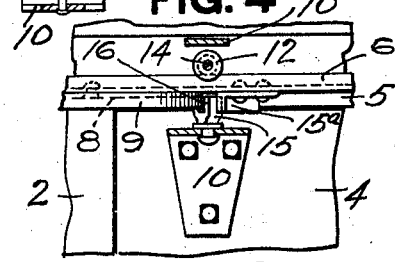
WITNESSES.
J. R. Keller
F. W. Kay.
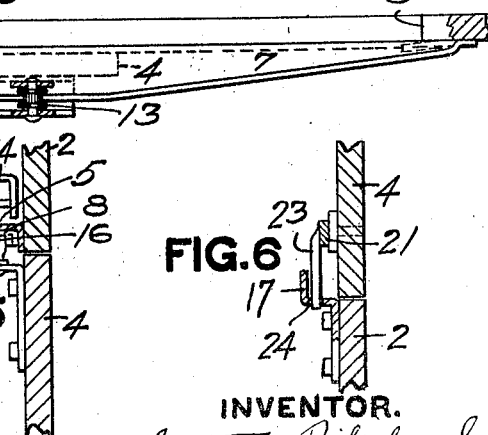
INVENTOR.
Justus A. Rickabaugh
By Kay, Totten
attys

UNITED STATES PATENT OFFICE.

JUSTUS A. RICKABAUGH, OF PITTSBURG, PENNSYLVANIA.

CAR-DOOR.

No. 903,406.

Specification of Letters Patent.

Patented Nov. 10, 1908.

Application filed January 17, 1908. Serial No. 411,298.

*To all whom it may concern:*

Be it known that I, JUSTUS A. RICKABAUGH, a resident of Pittsburg, in the county of Allegheny and State of Pennsylvania, have invented a new and useful Improvement in Car-Doors; and I do hereby declare the following to be a full, clear, and exact description thereof.

My invention relates to doors for box cars or other structures where a sliding door is required flush with the body of the car or other structure.

The object of my invention is to provide a simple and durable form of door in which the door when closed is securely held at a number of points flush with the body of the structure, and which may be readily drawn outwardly sufficiently to clear the side of the car and then moved quickly and with little exertion to one side to open the door.

To these ends my invention comprises, generally stated, in conjunction with a car or other structure, a guide rail or support above the opening, a door suspended from said guide rail on a trolley traveling on said rail, the trolley wheel having a certain amount of longitudinal movement with reference to its shaft, and a forked guiding member on said door adapted to engage a guide on the car with a relatively close engagement, said guide having a rounded or curved end portion.

In the accompanying drawing Figure 1 is a view of a portion of the side of a car showing my invention applied thereto, showing the door closed; Fig. 2 is a section on the line 2—2, Fig. 1; Fig. 3 is a like view showing the door partly open; Figs. 4 and 5 are enlarged details of the trolley and supporting rail; Fig. 6 is an enlarged detail of the locking mechanism.

Referring to the drawings the numeral 2 designates the side of a box car with the opening 3 closed by the door 4, which is chamfered or beveled along one edge 4ª. Above the door and extending a suitable distance beyond the opening 3 is the guide rail 5. This may be formed of suitable angle iron and said guide rail is provided with the flange 6. The guide rail 5 is tapered down at one end as at 7 where the flange 6 approaches nearer to the body of the car. Riveted or otherwise secured to the guide rail 5 is the angle-bar 8 with the depending flange 9. The flange 9 is slightly curved or turned inwardly at the end adjacent to the opening 3 for the purpose fully hereinafter set forth.

Secured to the door 4 are the hangers or brackets 10 and 11. Trolley wheels 12 and 13 are supported by the brackets 10 and 11. These wheels 12 and 13 are grooved and travel upon the flange 6 of the guide rail 5. The trolley wheel 12 is mounted on the shaft 14 which is supported by the bracket 10, said trolley wheel being freely movable longitudinally of said shaft so as to provide for the sliding movement of the door in opening after it has been drawn outwardly in the manner fully hereinafter set forth. Carried by the bracket 10 is the guide-member 15, said guide member having the forked portion 16 which is adapted to engage the depending flange 9 of the angle bar 8. The guide-member 15 is so secured to the bracket 10 as to have a slight pivotal motion or play to enable it to conform to the curved portion of the flange 9, and said guide member may therefore be swiveled to the bracket 10 to provide for this movement. An angle 15ª may be secured to the lower face of the guide rail, said angle being in contact with or close proximity to the guide member 15 to hold the door in position at that upper left hand corner and prevent its outward movement to any extent when said door is closed.

To support the lower end of the door in its sliding movement the car-body is provided with the guide-brackets 17. A wearstrip 18 is secured to the car body and a stop 19 is secured to the outer end of said strip.

In order to hold the door securely in place at the lower left hand corner to guard against outward movement at that point, I employ the lock 20. This lock consists of the arm 21 pivoted to the door at 22, said arm having the downwardly projecting bolt 23 which is adapted to enter the opening 24 in the guide bracket 17. A stop 25 is provided to limit the movement of the arm 21. The arm 21 has the opening 26 which is adapted to coincide with the opening of the staple 27. When these openings are in coincidence with each other the wire of the car seal may be passed through these openings and in this manner the lock is sealed.

To further secure the door in position and prevent its outward movement lugs 28 are secured to the car body, which lugs are adapted to project beyond the door when closed and so prevent any outward movement of the same.

The car may be further provided with the ordinary lock 29 and with the handle 30.

In the operation of my improved door, after the door has been unlocked the operator grasps the handle 30 and by simply pulling toward the left moves the door sufficiently to clear the edge of the car door, which movement is permitted owing to the longitudinal movement of the shaft 14 with relation to the trolley wheel 12. As the door is chamfered, it readily slips over the edge of the opening even without being drawn outwardly. Just as soon as the door has cleared the edge of the opening the operator simply throws the door to the left and the trolley wheels travel freely along the guide rail 5, so that the door is moved rapidly and with very little exertion. The guide-member 15 being in engagement with the flange 9 and said flange being curved at its inner end the guide-member guides the door along the flange 9 and the trolley wheel 12 accommodates itself to the outward movement of the door so that when the guide-member 15 reaches the straight portion of the flange 9 the trolley wheel 12 will be thrown toward the inner end of the shaft 14. As the guide-member 15 has a certain amount of play it can readily accommodate itself to the shape of the flange 9 so that there is no danger of any binding of the parts to interfere with the rapid and easy movement of the door. In closing the door the door is simply moved to the right and as soon as the guide-member 15 comes into engagement with the curved end of the flange 9 the door falls into position automatically and when the door is locked by the lock 20 at its lower left hand corner, all four corners of the door are securely held against outward movement, as the lugs 28 prevent any outward movement at the upper and lower right hand corners, and the angle 15ª prevents any undue outward movement at the upper left hand corner.

By my invention I provide a very simple easy moving form of door in which the number of parts is reduced to a minimum so that there is very little liability of it getting out of order.

What I claim is:

1. In a door for cars or other structures, the combination of a track, a door carried thereby, a wheel on said door engaging said track, a shaft, said wheel and shaft axially movable, the one with relation to the other, a swiveled guide member on said door having a forked portion, and a guide on said car which the forked portion of said guide member straddles with a relatively close engagement, one end of said guide being turned inwardly between said shaft and the car.

2. In a door for cars or other structures, the combination of a track, a door carried thereby, a bracket on said door, a wheel on said bracket engaging said track, a shaft, said wheel and shaft axially movable one with relation to the other, a guide on said car having one end turned inwardly between said track and the car, and a swiveled guide member on said bracket having a forked portion which straddles the guide and closely engages the same.

In testimony whereof, I the said JUSTUS A. RICKABAUGH have hereunto set my hand.

JUSTUS A. RICKABAUGH.

Witnesses:
WM. A. STEINMEYER,
ROBT. D. TOTTEN.